US010059005B2

(12) United States Patent
Huang et al.

(10) Patent No.: US 10,059,005 B2
(45) Date of Patent: Aug. 28, 2018

(54) METHOD FOR TEACHING A ROBOTIC ARM TO PICK OR PLACE AN OBJECT

(71) Applicant: QUANTA STORAGE INC., Taoyuan (TW)

(72) Inventors: Chung-Hsien Huang, Taoyuan (TW); Shih-Jung Huang, Taoyuan (TW)

(73) Assignee: QUANTA STORAGE INC., Taoyuan (TW)

( * ) Notice: Subject to any disclaimer, the term of this patent is extended or adjusted under 35 U.S.C. 154(b) by 21 days.

(21) Appl. No.: 15/189,292

(22) Filed: Jun. 22, 2016

(65) Prior Publication Data

US 2017/0368687 A1 Dec. 28, 2017

(51) Int. Cl.
| | |
|---|---|
| *G06F 19/00* | (2018.01) |
| *B25J 9/16* | (2006.01) |
| *G05B 19/423* | (2006.01) |

(52) U.S. Cl.
CPC ........... *B25J 9/1697* (2013.01); *B25J 9/1612* (2013.01); *G05B 19/423* (2013.01); *G05B 2219/39543* (2013.01)

(58) Field of Classification Search
CPC .............................. B25J 9/1627; B25J 9/1687
USPC .................................................. 700/245, 259
See application file for complete search history.

(56) References Cited

U.S. PATENT DOCUMENTS

| | | | | |
|---|---|---|---|---|
| 7,103,460 | B1 * | 9/2006 | Breed | B60C 23/0408 701/29.1 |
| 8,306,635 | B2 * | 11/2012 | Pryor | B60K 35/00 482/5 |
| 9,348,488 | B1 * | 5/2016 | Renema, II | G06F 3/0482 |
| 9,471,142 | B2 * | 10/2016 | Chizeck | G06F 3/016 |
| 2016/0034305 | A1 * | 2/2016 | Shear | G06F 9/50 707/722 |

* cited by examiner

*Primary Examiner* — Ronnie M Mancho
(74) *Attorney, Agent, or Firm* — Rabin & Berdo, P.C.

(57) ABSTRACT

A method for teaching a robotic arm to pick or place an object includes the following steps. Firstly, the robot arm is pushed until a target appears within a vision. Then, an appearance position of the target is set as a visual point. Then, a first image is captured. Then, the robot arm is pushed to a target position from the visual point. Then, the target position is set as a pick and place point. Then, an automatic movement control of the robot arm is activated. Then, the robot arm automatically picks and places the object and returns to the visual point from the pick and place point. Then, a second image is captured. Then, a differential image is formed by subtracting the second image from the first image, the target image is set according to the differential image, and image characteristic of the target are automatically learned.

12 Claims, 4 Drawing Sheets

METHOD FOR TEACHING A ROBOTIC ARM TO PICK OR PLACE AN OBJECT

TECHNICAL FIELD

The disclosure relates in general to a teaching method for a robot arm, and more particularly to a method for teaching the robot arm a movement path for picking and placing an object.

BACKGROUND

Along with the rapid development in the manufacturing technologies, such as factory automation, an object is positioned by a vision device, and a robot arm is guided to pick the object for automatic assembly to increase the production speed. The crux of the automatic movement efficiency of the robot arm lies in teaching the robot arm to automatically pick and place an object, which has become a prominent issue for the industries of robot arm.

The method for teaching the robot arm to automatically pick and place an object according to the prior art includes following steps: An object to pick is circled by a user, an image of the object is captured, the image of the object is determined using image processing, image characteristic of the object are analyzed, and the direction for picking the object is planned. Then, the image of the object is inputted via an operation interface of the robot arm, the robot arm is moved, the movement path for picking the object is taught to the robot arm, and image characteristic and direction of the object to pick are set.

Similarly, the method for teaching the robot arm to place an object according to the prior art includes following steps: A placing position for the object is circled by a user, an image of the placing position is captured, the image of the placing position is determined using image processing, image characteristic of the placing position are analyzed, and the direction for placing the object to the placing portion is planned. Then, the image of the placing portion is inputted via an operation interface of the robot arm, the robot arm is moved, the movement path for placing the object is taught to the robot arm, and image characteristic and direction of the placing portion are set.

Then, a robot arm is activated, the robot arm is controlled by a control device to automatically move towards the object according to a teaching movement path for picking the object, image characteristic of the object is positioned by a vision device, and the object having the said image characteristic is picked. Then, the robot arm is controlled by a control device to automatically move towards the placing position according to a teaching movement path for placing the object, and image characteristic of the placing position are positioned by a vision device. Lastly, the object is placed at the placing position having the said image characteristics.

According to the teaching method of robot arm of the prior art, the user needs to capture the images of the object and the placing position, and further perform image processing on the captured images, analyze the image characteristics, and set the direction for picking and placing the object. However, the teaching method of robot arm of the prior art requires many professional jobs that are beyond ordinary users' capacity and the complicated teaching operation further affects the operation efficiency of the robot arm. Therefore, the robot arm still has many problems to resolve when it comes to the teaching method for picking and placing an object.

SUMMARY

According to an object of the invention, a method for teaching a robot arm to pick and place an object is provided. A first image and a second image are sequentially captured by an eye-in-hand vision device disposed on the robot arm at a visual point, a differential image is formed from the captured images, and image characteristic of the object and the placing portion are automatically learned, such that the difficulty of use is reduced.

According to another object of the invention, a method for teaching a robot arm to pick and place an object is provided. The user only needs to move a robot arm to a visual point and a pick and place point and teach a movement path to the robot arm, and the robot arm will automatically learn the rest operations, such that the teaching operation can be simplified.

To achieve the above objects of the invention, the method for teaching a robot arm to pick and place an object include following steps: Firstly, a robot arm is pushed until a target appears within the vision of an eye-in-hand vision device. Then, an appearance position of the target is set as a visual point. Then, a first image is captured by the eye-in-hand vision device at a visual point. Then, the robot arm is pushed to reach a target position from the visual point. Then, the target position is set as a pick and place point. Then, automatic movement control of the robot arm is activated. Then, the object is automatically picked or placed by the robot arm and returns back to the visual point from the pick and place point. Then, the eye-in-hand vision device is controlled to capture a second image at the visual point. Then, a differential image is formed by subtracting the second image from the first image, a target image is set according to the differential image, and image characteristic of the target are automatically learned.

During the process for teaching the robot arm to pick an object, the target is the object picked from the placing portion by the robot arm; the first image, being an image captured before the object is picked, shows the image of the placing portion with the object; the second image, being an image captured after the object is captured, shows the image of the placing portion; a differential image of the object is formed by subtracting the second image from the first image. During the process for teaching the robot arm to place an object, the target is a placing platform on which the robot arm places the object; the first image, being an image captured before the object is placed, shows the image of the placing portion; the second image, being an image captured after the object is captured, shows the image of the placing portion with the object; a differential image of the object is formed by subtracting the second image from the first image; the image of the placing portion surrounding the object is set.

According to the method for teaching a robot arm to pick and place an object, the robot arm is connected to a control device; the vision of the eye-in-hand vision device is shown on the screen connected to the control device; the first and second images captured by the eye-in-hand vision device are recorded in the control device; the teaching movement path, being the path along which robot arm is pushed to the pick and place point from the visual point, is recorded in the control device. The robot arm automatically returns to the visual point from the pick and place point along the teaching movement path.

The above and other aspects of the invention will become better understood with regard to the following detailed description of the preferred but non-limiting embodiment(s). The following description is made with reference to the accompanying drawings.

DETAILED DESCRIPTION

The technical methods adopted to achieve the above objects of the invention and the consequent effects are disclosed in a number of preferred embodiments below with reference to the accompanying drawings.

Figure 1:
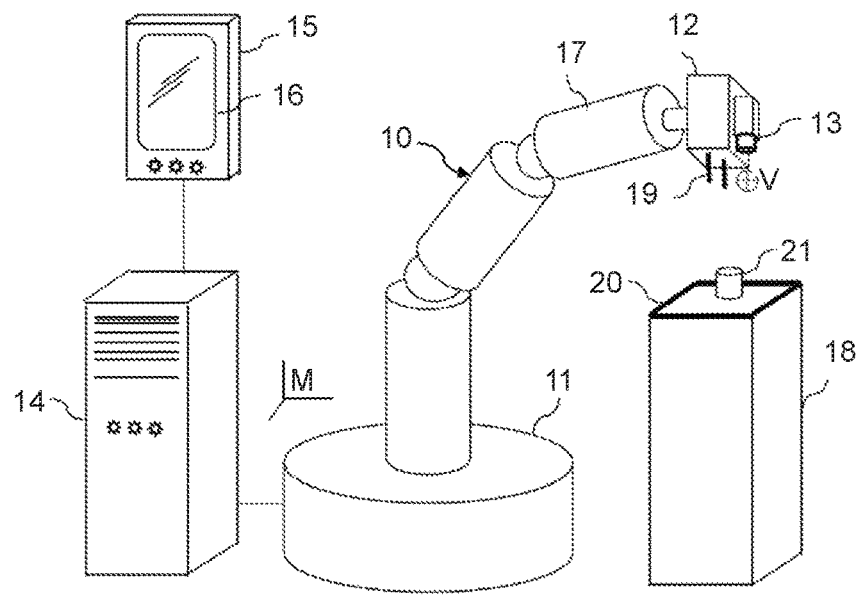
FIG. 1 is a schematic diagram of moving a robot arm to a visual point according to the invention.
Figure 2:
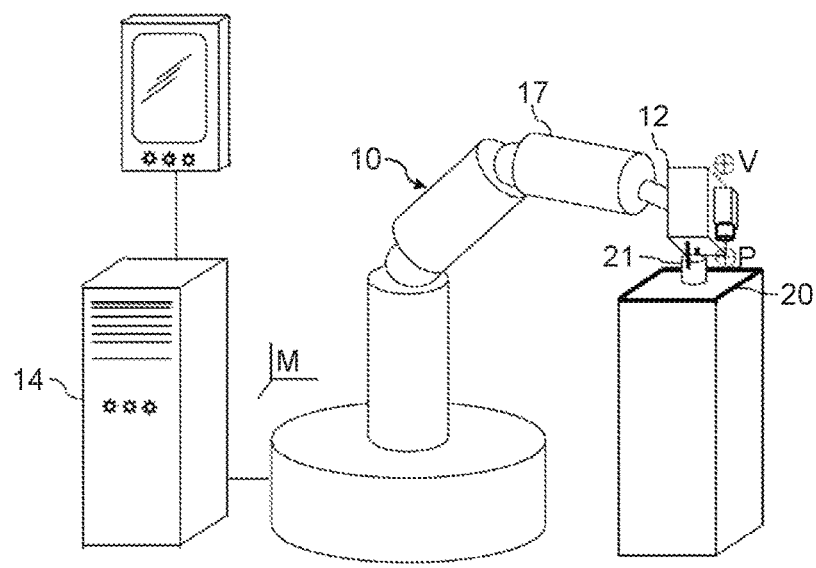
FIG. 2 is a schematic diagram of moving a robot arm to a pick and place point according to the invention.
Figure 3:
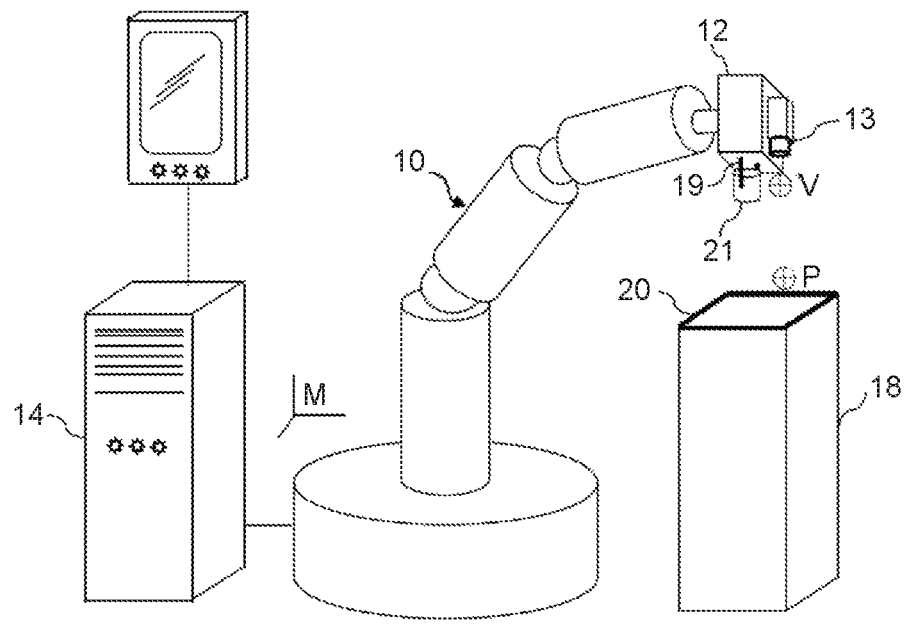
FIG. 3 is a schematic diagram of returning a robot arm to a visual point according to the invention.
Figure 4:
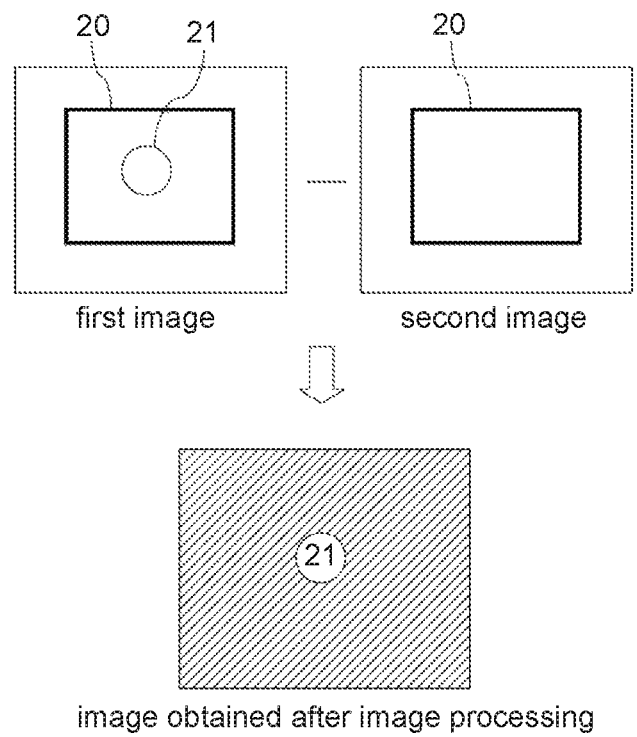
FIG. 4 is a schematic diagram of image processing of an object according to the invention.

Refer to FIG. 1, FIG. 2, FIG. 3 and FIG. 4. FIG. 1 is a schematic diagram of moving a robot arm to a visual point according to the invention. FIG. 2 is a schematic diagram of moving a robot arm to a pick and place point according to the invention. FIG. 3 is a schematic diagram of returning a robot arm to a visual point according to the invention. FIG. 4 is a schematic diagram of image processing of an object according to the invention. As indicated in FIG. 1, one end of the robot arm 10 of the invention is fixed on a main body 11, an arm reference coordinate M is set, and an eye-in-hand vision device 13 is disposed at a movable portion 12 on the other end of the robot arm 10. The robot arm 10 is connected to a control device 14. Through an operation interface 15 and a screen 16, the control device 14 moves the robot arm 10 and controls the eye-in-hand vision device 13 to capture an image. By processing and analyzing the captured image, the robot arm 10 drives a number of toggles 17 and the movable portion 12 to approach a machine platform 18 disposed in the working environment of the robot arm 10, and further use a picking device 19 to pick the target object 21 from the placing portion 20 of the machine platform 18.

During the process of teaching the robot arm 10 to pick the object 21, the toggles 17 of the robot arm 10 rotate as the movable portion 12 of the robot arm 10 is pushed manually. Since the rotation angle of each toggle 17 can be detected by sensors, the movement position and track of the movable portion 12 with respect to the main body 11 are recorded by the control device 14 using arm reference coordinate M. The movable portion 12 is manually pushed to the top of the placing portion 20 of the machine platform 18, such that the vision of the eye-in-hand vision device 13 can be shown on the screen 16 of the operation interface 15 until the object 21 on the machine platform 18 appears on the screen 16. The appearance position of the object 21 is set as a visual point V. The eye-in-hand vision device 13 captures a first image at the visual point V, and then the control device 14 further records the first image. As indicated in FIG. 4, the first image, being the image captured before the object 21 is picked, shows the image of the placing portion 20 of the machine platform 18 with the object 21.

As indicated in FIG. 2, when the robot arm 10 is taught to pick the object 21, the movable portion 12 of the robot arm 10 is manually pushed to approach the object 21 placed on the placing portion 20 from the visual point V according to a planned movement path. When the robot arm 10 reaches a picking position of the object 21, the picking position is set as a pick and place point P. The control device 14 records a teaching movement path, along which the movable portion 12 is moved to the pick and place point P from the visual point V, by detecting the rotation angles of the toggles 17 of the robot arm 10.

As indicated in FIG. 3, automatic movement control of the robot arm 10 is activated, the control device 14 controls the picking device 19 of the robot arm 10 to automatically pick the object 21 from the placing portion 20 of the machine platform 18 and move the movable portion 12 back to the visual point V from the pick and place point P along the teaching movement path from the pick and place point P the visual point V. The control device 14 controls the eye-in-hand vision device 13 to capture a second image at the visual point V, and then further records the second image. As indicated in FIG. 4, the second image, being an image captured after the object 21 is picked, only shows the image of the placing portion 20 of the machine platform 18. The object 21 is not included in the second image.

As indicated in FIG. 4, the control device 14 performs image processing on the first and second images captured at the visual point V. A differential image is formed by subtracting the second image from the first image. The first image, being an image captured before the object 21 is picked, shows the image of the placing portion 20 with the object 21. The second image, being an image captured after the object 21 is picked, shows the image of the placing portion 20 only. After the image processing of subtracting the second image from the first image, only the differential image of the object 21 is left. The control device 14 automatically learns image characteristic of the object 21 to facilitate recognizing and picking the object 21 placed on the placing portion 20. The image characteristic of the object 21 are obtained from the said image processing.

Figure 5:
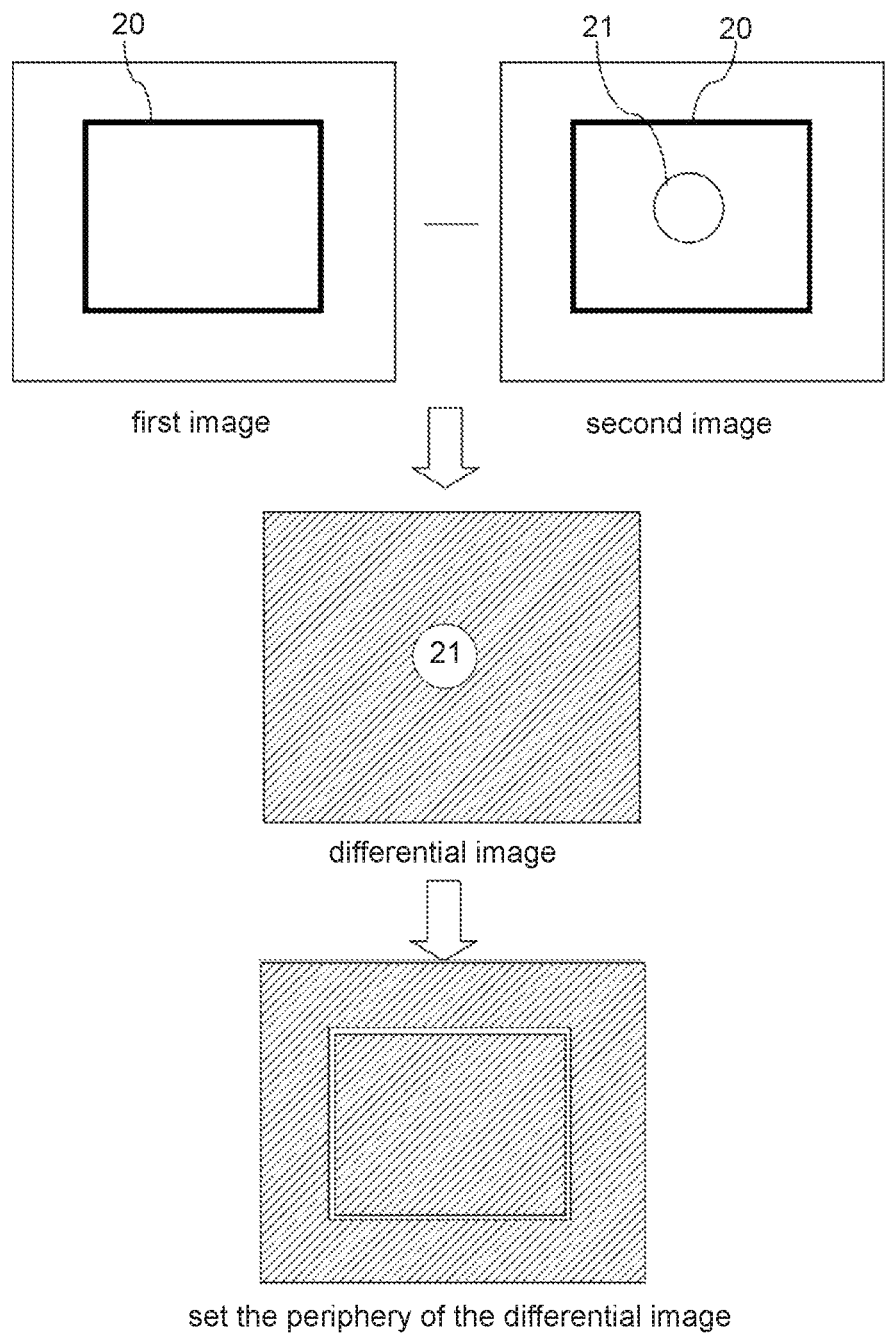
FIG. 5 is a schematic diagram of image processing of a placing portion according to the invention.
Figure 6:
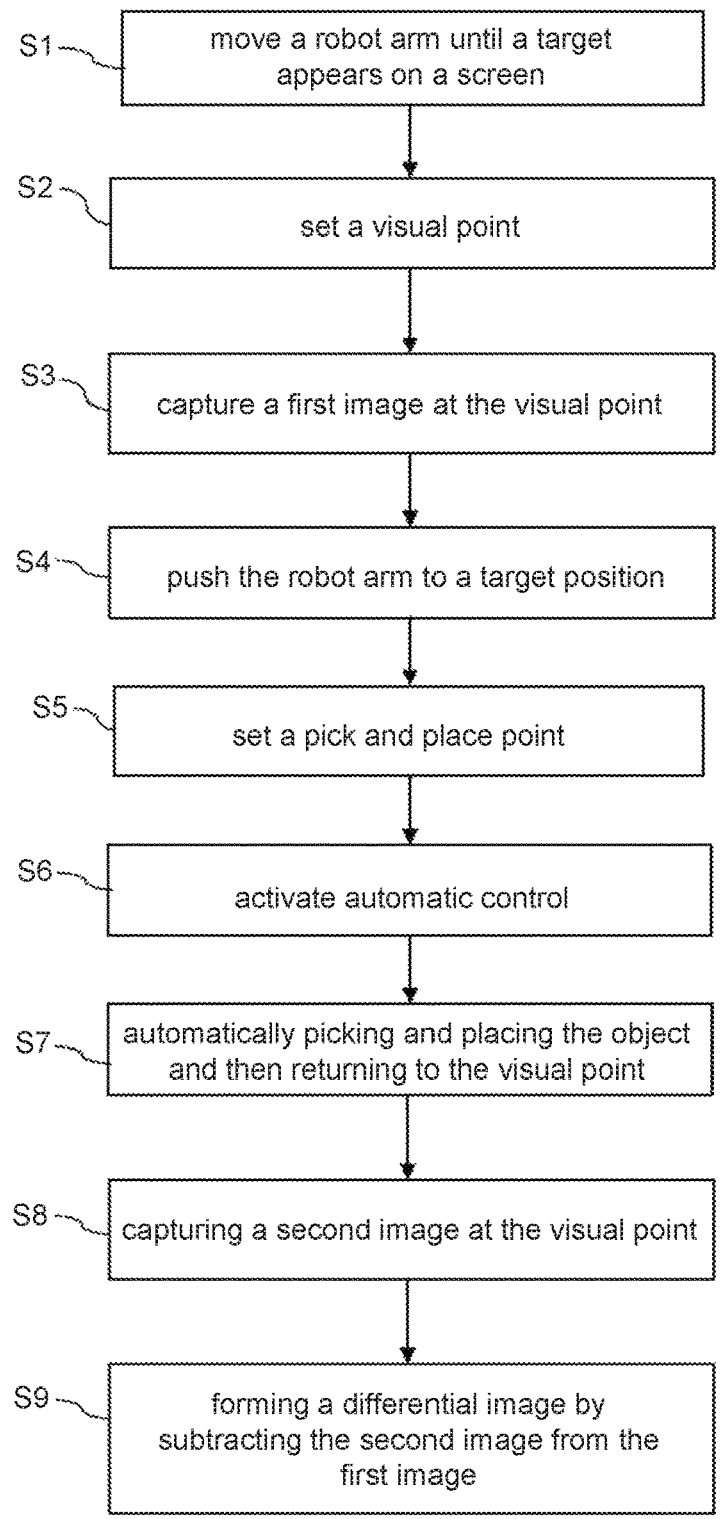
FIG. 6 is a flowchart of a method for teaching a robot arm to pick an object according to the invention.

The process of teaching the robot arm 10 to place the object 21 is illustrated with reference to FIG. 1, FIG. 2, FIG. 3 and FIG. 5. FIG. 5 is a schematic diagram of image processing of a placing portion according to the invention. Similarly, the process of teaching the robot arm 10 to place the object 21 is opposite to the process of teaching the robot arm 10 to pick the object 21, and the only difference lies in that the robot arm 10 picks the object 21 at the visual point and then moves to the placing portion 20 for placing the object 21. As indicated in FIG. 3, the movable portion 12 is manually pushed to the top of the placing portion 20 on which the object 21 is placed, such that the placing portion 20 is within the vision of the eye-in-hand vision device 13 and appears on the screen 16. The appearance position of the placing portion 20 is set as a visual point V, at which the eye-in-hand vision device 13 captures a first image. The control device 14 further records the first image. As indicated in FIG. 6, the first image, being an image captured before the object 21 is picked, shows the placing portion 20 of the machine platform 18 only. The object 21 is not included in the first image.

As indicated in FIG. 2, when the robot arm 10 is taught to place the object 21, the movable portion 12 of the robot arm 10 is manually pushed to a placing position of the object 21 from the visual point V, the placing position is set as a pick and place point P, and a teaching movement path, along which the movable portion 12 is moved to the pick and place point P from the visual point V, is recorded. As indicated in FIG. 1, when the automatic movement control of the robot arm 10 is activated, the control device 14 controls the picking device 19 of the robot arm 10 to automatically place the object 21 on the placing portion 20 of the machine platform 18, and moves the movable portion 12 back to the visual point V from the pick and place point P along the teaching movement path. The control device 14 controls the eye-in-hand vision device 13 to capture a second image at the visual point V. The control device 14 further records the second image. As indicated in FIG. 6, the second image, being an image captured after the object 21 is placed, only shows the image of the object 21 placed on the placing portion 20.

As indicated in FIG. 5, the control device 14 subtracts the second image from the first image at the visual point V to form a differential image. After the differential image of the object 21 is obtained, the periphery of the differential image of the object 21 is set as a reserved image. Therefore, after image processing is completed, only the image of the placing portion 20 is left. Based on the processed image of the placing portion 20, the control device 14 automatically learns image characteristic of the placing portion 20 to facilitate recognizing and placing the object 21 on the placing portion 20.

As indicated in FIG. 6, a flowchart of a method for teaching a robot arm to pick an object according to the invention is shown. Based on the foregoing descriptions of teaching a robot arm to place or pick an object, it can be known that the picking process is opposite to the placing process. If both the object and the placing portion are regarded as a target during each movement process, then the picking process and the placing process would be similar to each other. Therefore, the process of picking an object and the process of placing an object can be illustrated by the same process which includes following steps. Firstly, the method begins at step S1, a robot arm is pushed until a target appears within the vision of an eye-in-hand vision device. In step S2, an appearance position of the target is set as a visual point. Then, the method proceeds to step S3, a first image is captured by the eye-in-hand vision device at a visual point, and the first image is recorded. Then, the method proceeds to step S4, the robot arm is pushed to a target position from the visual point. Then, the method proceeds to step S5, the target position is set as a pick and place point, and a teaching movement path from the visual point to the pick and place point is recorded. Then, the method proceeds to step S6, automatic movement control of the robot arm is activated. Then, the method proceeds to step S7, the object is automatically picked or placed by the robot arm, which returns back to the visual point from the pick and place point along the teaching movement path. Then, the method proceeds to step S8, the eye-in-hand vision device is controlled to capture a second image at the visual point, and the second image is recorded. Then, the method proceeds to step S9, a differential image is formed by subtracting the second image from the first image, the target image is set according to the differential image, and image characteristic of the target are automatically learned.

According to the method for teaching a robot arm to pick and place an object disclosed in above embodiments of the invention, a movement path can be taught to the robot arm by moving the robot arm to a visual point and a pick and place point with only a small amount of labor. An eye-in-hand vision device on the robot arm is used to capture a first image at a visual point and capture a second image when the robot arm automatically returns to the visual point from the pick and place point. A required image can be obtained according to a differential image formed from the first and second images. Image characteristic of the object and the placing portion can be automatically learned. The teaching method of the invention not only simplifies the teaching operation but further dispenses with professional level of image processing technology and reduces the difficulty of use.

It will be apparent to those skilled in the art that various modifications and variations can be made to the disclosed embodiments. It is intended that the specification and examples be considered as exemplary only, with a true scope of the present disclosure being indicated by the following claims and their equivalents.

What is claimed is:

1. A method for teaching a robot arm to pick and place an object, comprising:
   pushing the robot arm until an object appears within a vision of an image capturing device;
   setting an appearance position of the object as a visual point;
   controlling the image capturing device to capture a first image at the visual point;
   pushing the robot arm to the object from the visual point;
   setting an arm position of the robot arm as a pick and place point;
   activating an automatic movement control of the robot arm;
   by the activated automatic movement control, automatically picking the object by the robot arm and returning the robot arm to the visual point from the pick and place point;
   controlling the image capturing device to capture a second image at the visual point; and
   forming a differential image by subtracting the second image from the first image, setting an object image according to the differential image and automatically learning an image characteristic of the object;
   wherein the robot arm is connected to a control device, the vision of the image capturing device is shown on the screen connected to the control device, and the captured first and second images are recorded in the control device;
   wherein the teaching movement path is the path along which robot arm is pushed to the pick and place point from the visual point and is recorded in the control device.

2. The method for teaching the robot arm to pick and place the object according to claim 1, wherein the teaching method is for teaching the robot arm a process of picking the object.

3. The method for teaching the robot arm to pick and place the object according to claim 2, wherein the object is the object picked from a placing portion by the robot arm during the picking process.

4. The method for teaching the robot arm to pick and place the object according to claim 3, wherein the first image is an image captured before the object is picked and shows the image of the object within the placing portion.

5. The method for teaching the robot arm to pick and place the object according to claim 4, wherein the second image is an image captured after the object is captured and shows the image of the placing portion.

6. The method for teaching the robot arm to pick and place the object according to claim 5, wherein the differential image of the object is formed by subtracting the second image from the first image.

7. The method for teaching the robot arm to pick and place the object according to claim 1, wherein the teaching method is for teaching the robot arm a process for placing the object.

8. The method for teaching the robot arm to pick and place the object according to claim 7, wherein the object is a placing platform on which the robot arm places the object during the placing process.

9. The method for teaching the robot arm to pick and place the object according to claim 8, wherein the first image is an image captured before the object is placed and shows the image of the placing portion.

10. The method for teaching the robot arm to pick and place the object according to claim 9, wherein the second image is an image captured after the object is captured and show the image of the placing portion with the object.

11. The method for teaching the robot arm to pick and place the object according to claim 1, wherein the differential image of the object is formed by subtracting the second image from the first image, and the image of the placing portion surrounding the object is set.

12. The method for teaching the robot arm to pick and place the object according to claim 1, wherein the robot arm automatically returns to the visual point from the pick and place point along the teaching movement path.

* * * * *